US012293521B2

(12) United States Patent
Tsai et al.

(10) Patent No.: US 12,293,521 B2
(45) Date of Patent: May 6, 2025

(54) APPARATUS AND METHODS FOR IMAGE SEGMENTATION USING MACHINE LEARNING PROCESSES

(71) Applicant: QUALCOMM Incorporated, San Diego, CA (US)

(72) Inventors: Chung-Chi Tsai, San Diego, CA (US); Shubhankar Mangesh Borse, San Diego, CA (US); Meng-Lin Wu, San Diego, CA (US); Venkata Ravi Kiran Dayana, San Diego, CA (US); Fatih Murat Porikli, San Diego, CA (US); An Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/901,429

(22) Filed: Sep. 1, 2022

(65) Prior Publication Data

US 2024/0078679 A1 Mar. 7, 2024

(51) Int. Cl.
*G06T 7/11* (2017.01)
*G06T 7/73* (2017.01)
*G06V 30/19* (2022.01)

(52) U.S. Cl.
CPC ............... *G06T 7/11* (2017.01); *G06T 7/74* (2017.01); *G06V 30/19153* (2022.01); *G06V 30/19173* (2022.01); *G06T 2207/20112* (2013.01)

(58) Field of Classification Search
CPC ... G06T 7/11; G06T 7/74; G06T 2207/20112; G06T 2207/20081; G06T 2207/20084; G06V 30/19153; G06V 30/19173
See application file for complete search history.

(56) References Cited

U.S. PATENT DOCUMENTS

2010/0316294 A1\* 12/2010 Perner ................... G06V 10/28
382/173
2022/0292684 A1\* 9/2022 Wang .................. G06N 3/0455
2023/0334318 A1\* 10/2023 Liu ..................... G06F 18/2323

OTHER PUBLICATIONS

Broomhead D.S., et al., "Radial Basis Functions, Multi-Variable Functional Interpolation and Adaptive Networks", Royal Signals and Radar Establishment, Malvern (United Kingdom), Mar. 28, 1988, 39 Pages.

(Continued)

*Primary Examiner* — John B Strege
(74) *Attorney, Agent, or Firm* — Polsinelli LLP

(57) ABSTRACT

Methods, systems, and apparatuses for image segmentation are provided. For example, a computing device may obtain an image, and may apply a process to the image to generate input image feature data and input image segmentation data. Further, the computing device may obtain reference image feature data and reference image classification data for a plurality of reference images. The computing device may generate reference image segmentation data based on the reference image feature data, the reference image classification data, and the input image feature data. The computing device may further blend the input image segmentation data and the reference image segmentation data to generate blended image segmentation data. The computing device may store the blended image segmentation data within a data repository. In some examples, the computing device provides the blended image segmentation data for display.

20 Claims, 7 Drawing Sheets

(56) References Cited

OTHER PUBLICATIONS

Bubeck S., et al., "A Law of Robustness for Two-Layers Neural Networks", Conference on Learning Theory, PMLR, 2021, pp. 1-17.

Castro F.M., et al., "End-to-End Incremental Learning", Proceedings of the European Conference on Computer Vision (ECCV), Sep. 2018, 21 Pages.

Hayes T.L., et al., "Remind Your Neural Network to Prevent Catastrophic Forgetting", European Conference on Computer Vision, Springer, Cham, 2020, 18 Pages.

Li T., et al., "Federated Learning: Challenges, Methods, and Future Directions", IEEE Signal Processing Magazine 37.3, May 2020, pp. 50-60.

Tsai C-C., et al., "Deep Co-Saliency Detection via Stacked Autoencoder-Enabled Fusion and Self-Trained CNNs", IEEE Transactions on Multimedia 22.4 (2019), pp. 1-16, Apr. 2020.

Tsai C-C., et al., "Image Co-Saliency Detection and Co-Segmentation via Progressive Joint Optimization", IEEE Transactions on Image Processing 28.1 (2018), DOI:10.1109/TIP.2018.2861217, Jul. 30, 2018, pp. 1-16.

Xiaofeng L., et al., "Data Augmentation via Latent Space Interpolation for Image Classification", 2018 24th International Conference on Pattern Recognition (ICPR). IEEE, Aug. 20-24, 2018, pp. 728-733.

* cited by examiner

APPARATUS AND METHODS FOR IMAGE SEGMENTATION USING MACHINE LEARNING PROCESSES

BACKGROUND

Field of the Disclosure

This disclosure relates generally to processes for image segmentation and, more specifically, to processes for image segmentation using machine learning processes.

Description of Related Art

Image capture devices, such as phones, tablets, personal computers, gaming devices, internet of things (IoT) devices, and smart devices, may capture images using, for example a camera. The image capture devices may include image segmentation technology to identify parts of a captured image. For instance, the image capture devices may apply an image segmentation process to a red, green, and blue (RGB) image to detect and classify objects within the image. The detected objects may be utilized in a variety of applications, such as in gaming, computer vision, augmented reality (AR), virtual reality (VR), medical, and robotics applications, among others.

SUMMARY

According to one aspect, a method includes applying a process to an input image to generate input image feature data characterizing features of the input image and input image segmentation data characterizing a segmentation of the input image. Further, the method includes obtaining reference image feature data characterizing features of each of a plurality of reference images. The method also includes obtaining reference image classification data characterizing a classification of each of the plurality of reference images. The method further includes generating reference image segmentation data based on the reference image feature data, the reference image classification data, and the input image feature data. The method also includes applying a blending process to the input image segmentation data and the reference image segmentation data to generate blended image segmentation data, the blended image segmentation data characterizing a final segmentation of the input image.

According to another aspect, an apparatus comprises a non-transitory, machine-readable storage medium storing instructions, and at least one processor coupled to the non-transitory, machine-readable storage medium. The at least one processor is configured to apply a process to an input image to generate input image feature data characterizing features of the input image and input image segmentation data characterizing a segmentation of the input image. Further, the at least one processor is configured to obtain reference image feature data characterizing features of each of a plurality of reference images. The at least one processor is also configured to obtaining reference image classification data characterizing a classification of each of the plurality of reference images. The at least one processor is further configured to generating reference image segmentation data based on the reference image feature data, the reference image classification data, and the input image feature data. The at least one processor is also configured to apply a blending process to the input image segmentation data and the reference image segmentation data to generate blended image segmentation data, the blended image segmentation data characterizing a final segmentation of the input image.

According to another aspect, a non-transitory, machine-readable storage medium stores instructions that, when executed by at least one processor, causes the at least one processor to perform operations that include applying process to an input image to generate input image feature data characterizing features of the input image and input image segmentation data characterizing a segmentation of the input image. Further, the operations include obtaining reference image feature data characterizing features of each of a plurality of reference images. The operations also include obtaining reference image classification data characterizing a classification of each of the plurality of reference images. The operations further include generating reference image segmentation data based on the reference image feature data, the reference image classification data, and the input image feature data. The operations also include applying a blending process to the input image segmentation data and the reference image segmentation data to generate blended image segmentation data, the blended image segmentation data characterizing a final segmentation of the input image.

According to another aspect, an image capture device includes a means for applying a process to an input image to generate input image feature data characterizing features of the input image and input image segmentation data characterizing a segmentation of the input image. Further, the image capture device includes a means for obtaining reference image feature data characterizing features of each of a plurality of reference images. The image capture device also includes a means for obtaining reference image classification data characterizing a classification of each of the plurality of reference images. The image capture device further includes a means for generating reference image segmentation data based on the reference image feature data, the reference image classification data, and the input image feature data. The image capture device also includes a means for applying a blending process to the input image segmentation data and the reference image segmentation data to generate blended image segmentation data, the blended image segmentation data characterizing a final segmentation of the input image.

DETAILED DESCRIPTION

Figure 1:
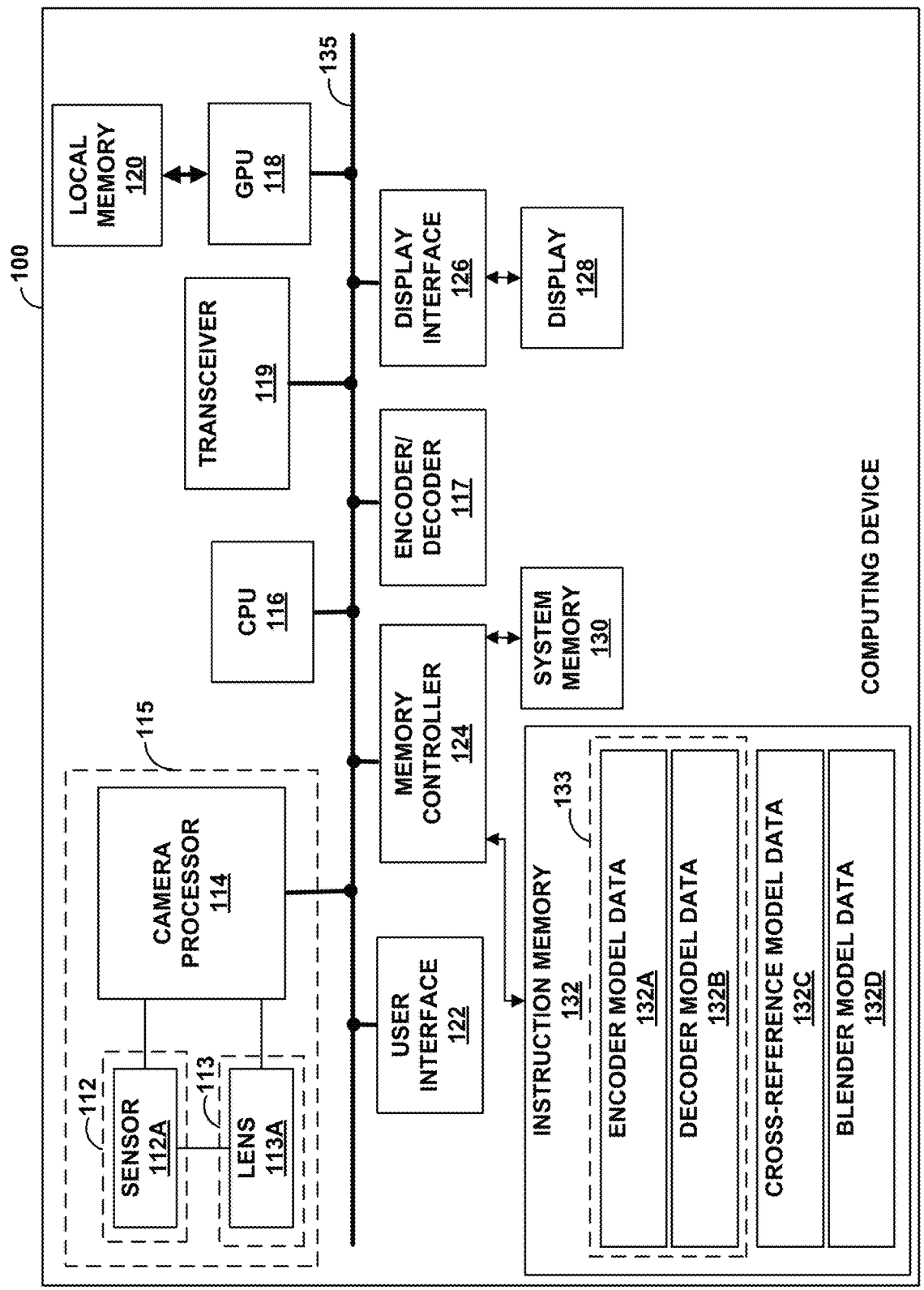
FIG. 1 is a block diagram of an exemplary image segmentation device, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

Various systems, such as gaming, computer vision, augmented reality (AR), virtual reality (VR), medical, and robotics applications rely on image segmentation technology to, for example, detect and identify objects within images. For example, imaging devices, such as digital cameras, smartphones, tablet computers, laptop computers, automobiles, or Internet-of-things (IoT) devices (e.g., security cameras, etc.), may capture an image that includes various objects, such as one or more persons, trees, animals, a skyline, a body of water, or any other object, and may apply an image segmentation process to the image to classify various portions of the image as, for example, an object. In some examples, a device may adjust values of pixels corresponding to the portion of an image that includes the object. For instance, the device may apply one or more image processing operations, such as one or more of automatic focus (AF), automatic exposure (AE), automatic gain (AG), or automatic white balance (AWB), to the portion of the image classified as the object.

The use of existing image segmentation technologies, however, struggle to perform consistently across various devices. For example, differences in device hardware, such as different lens and sensors, or varying camera settings, may cause a same segmentation model to perform differently on the different devices. As a result, portions of a same image may be classified differently (e.g., skyline versus a person, grass versus pavement, etc.) across the different devices. As an example, a device with a camera set to capture images using a "long exposure" may, using a segmentation model, segment (e.g., classify) an image differently than another device using the same segmentation model but with a camera set to capture images using a "short exposure."

Similarly, differences among image signal processing (ISP) tuning parameters may also cause a same segmentation model to perform differently on the different devices. For example, a device set to apply a first saturation (e.g., default saturation) to a captured may, using a segmentation model, segment an image differently than another device using the same segmentation model but with the device set to apply a second saturation (e.g., enhanced saturation) different than the first saturation. Further, image segmentation results of sequential frames of a captured video in an imaging device may also differ, thereby resulting in "flicker" when the video is played. As such, many image segmentation applications can benefit from image segmentation processes that more accurately and consistently segment images.

In some implementations, an image capture device may include one or more optical elements, such as an assembly of one or more lenses (e.g., a lens assembly), that focus incident light onto an imaging sensor disposed at a corresponding imaging plane (e.g., an array of sensing elements formed within a semiconductor substrate). The lens assemblies may also include a shutter that, when open, allows the incident light to reach sensing elements of the imaging sensor. Each of the sensing elements may collect incident light and generate an electrical signal, which characterizes and measures a value of a luminance of the incident light and, further, a chrominance of the incident light. For example, each of the sensing elements may include color-filtered photodiodes, e.g., to establish red, green, and blue (RGB) color channels. The imaging sensor may use various capture modes under various circumstances to capture frames of image data, such as video data or still images (e.g., snapshots).

Further, the image capture device may include one or more processors that execute one or more machine learning processes, such as the trained segmentation model (e.g., semantic segmentation model) and the cross-reference model described herein, to segment an image, such as an image captured with the imaging sensor. The one or more processors may include, for example, a camera processor, a central processing unit (CPU), a graphical processing unit (GPU), a digital signal processor (DSP), or a neural processing unit (NPU). Based on the execution of instructions stored in non-volatile memory, the one or more processors may input elements of the captured image to the trained segmentation model to generate and output image feature data as well as image segmentation data. For instance, as described herein, an encoder of the trained segmentation model may generate and output the image feature data, and a decoder of the trained segmentation model may output the image segmentation data. The image feature data may identify and characterize features of the captured image, while the image segmentation data (e.g., segmentation logit values) may identify segments of the captured image. For example, the image segmentation data may characterize a classification of each pixel of the captured image.

Further, the one or more processors may execute the instructions to obtain reference feature data that identifies and characterizes features of each of a plurality of reference images. The reference feature data may be stored in a local memory device, or may be obtained over a communication network (e.g., from the cloud) from another computing device, for instance. In some examples, the one or more processors may execute the instructions to obtain the plurality of reference images from the local memory device, and may input elements of the plurality of reference images to the trained segmentation model to generate and output the reference feature data. For instance, and based on the elements of the plurality of reference images, the encoder of the trained segmentation model may output the reference feature data (e.g., in real-time). The plurality of reference images may be stored in the local memory device, or may be obtained over the communication network from another computing device. The one or more processors may also execute the instructions to obtain reference classification data identifying and characterizing a classification (e.g., label) of each pixel of the plurality of reference images. For instance, the pixel classifications may have been predetermined (e.g., offline labeling) and stored along with the plurality of reference images (e.g., within the local memory device, or obtained over the network). The reference classification data may include a classification for each pixel of a plurality of color channels of each of the plurality of reference images.

Further, the one or more processors may execute the instructions to input elements of the reference feature data, the reference classification data, and the input feature data to the cross-reference model to generate and output reference segmentation data (e.g., reference image logit values). The one or more processors may also execute the instructions to perform operations to blend the input segmentation data and the reference segmentation data to generate blended segmentation data (e.g., blended image logit values). For example, the one or more processors may execute the instructions to perform operations that alpha-blend the input segmentation data with the reference segmentation data to generate the blended segmentation data. The blended segmentation data may identify and characterize, for each of a plurality of classes, values (e.g., probability values) corresponding to each pixel of the captured image. The one or more processors may also execute the instructions to generate final segmentation image based on the blended segmentation data. For instance, the one or more processors may execute the instructions to perform operations that determine, for each pixel, the class with the largest predicted probability. In some instances, the operations may include performing an argmax operation on the blended segmentation data to determine the class with the highest value (e.g., probability) for each pixel.

As described herein, the segmentation model may be trained against input images. For example, the one or more processors may execute the instructions to execute the segmentation model to ingest elements of an input image to generate input segmentation data, and may determine one or more losses based on the input segmentation data and reference segmentation data. For instance, and as described herein, the one or more processors may execute the instructions to determine a loss between the input segmentation data and the reference segmentation data, and may determine whether the segmentation model is sufficiently trained based on the determined loss. The loss may be, for example, a fidelity loss that characterizes errors between the input segmentation data and the reference segmentation data. If the computed losses indicate that the segmentation model is not sufficiently trained (e.g., the one or more computed losses do not meet corresponding thresholds, etc.), the one or more processors continue performing operations to train the segmentation model (e.g., with additional training images).

When training is complete, the one or more processors execute the instructions to store values for configuration parameters, hyperparameters, and/or weights associated with the trained segmentation model in a data repository. The stored values for the configuration parameters, hyperparameters, and/or weights allow the one or more processors to configure the segmentation model (e.g., the trained segmentation model) for use during inference. For example, the one or more processors may execute instructions to obtain the configuration parameters, hyperparameters, and/or weights from the data repository, and may configure the segmentation model with the obtained configuration parameters, hyperparameters, and/or weights for (e.g., real-time) execution during inference.

Among other advantages, the embodiments described herein may provide image segmentation capabilities that can more reliably, accurately, and consistently, segment an image across various devices (e.g., multiple devices of a same brand and model). For example, the embodiments may allow for more consistent image classifications across devices with varying hardware and device settings. As such, the embodiments may allow, for example, for more accurate object detection across the various devices. For instance, the embodiments may allow for more accurate object detection across a variety of applications including gaming, computer vision, AR, VR, medical imaging, and autonomous driving, among others. Persons of ordinary skill in the art having the benefit of these disclosures would recognize these and other benefits as well.

FIG. 1 is a block diagram of an exemplary image capture device 100. The functions of image capture device 100 may be implemented in one or more processors, one or more field-programmable gate arrays (FPGAs), one or more application-specific integrated circuits (ASICs), one or more state machines, digital circuitry, any other suitable circuitry, or any suitable hardware. Image capture device 100 may perform one or more of the exemplary functions and processes described in this disclosure. Examples of image capture device 100 include, but are not limited to, a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, a head mounted device such as a virtual reality device (e.g., a virtual reality headset) or an augmented reality device (e.g., augmented reality glasses), or any device that may include one or more cameras.

As illustrated in the example of FIG. 1, image capture device 100 may include one or more image sensors 112, such as image sensor 112A, one or more lenses 113, such as lens 113A, and one or more camera processors, such as camera processor 114. In some instances, camera processor 114 may be an image signal processor (ISP) that employs various image processing algorithms to process image data (e.g., as captured by corresponding ones of these lenses and sensors). For example, camera processor 114 may include an image front end (IFE) and/or an image processing engine (IPE) as part of a processing pipeline. Further, a camera 115 may refer to a collective device including one or more image sensors 112, one or more lenses 113, and one or more camera processors 114.

In some examples, one of image sensors 112 may be allocated for each of lenses 113. Further, in some examples, one or more of image sensors 112 may be allocated to a corresponding one of lenses 113 of a respective, and different, lens type (e.g., a wide lens, ultra-wide lens, telephoto lens, and/or periscope lens, etc.). For instance, lenses 113 may include a wide lens, and a corresponding one of image sensors 112 having a first size (e.g., 108 MP) may be allocated to the wide lens. In other instance, lenses 113 may include an ultra-wide lens, and a corresponding one of image sensors 112 having a second, and different, size (e.g., 16 MP) may be allocated to the ultra-wide lens. In another instance, lenses 113 may include a telephoto lens, and a corresponding one of image sensors 112 having a third size (e.g., 12 MP) may be allocated to the telephoto lens.

In an illustrative example, a single image capture device 100 may include two or more cameras (e.g., two or more of camera 115), and at least two of the cameras include image sensors (e.g., image sensors 112) having a same size (e.g., two 12 MP sensors, three 108 MP sensors, three 12 MP sensors, two 12 MP sensors and a 108 MP sensor, etc.). Further, in some examples, a single image sensor, e.g., image sensor 112A, may be allocated to multiple ones of lenses 113. Additionally, or alternatively, each of image sensors 112 may be allocated to a different one of lenses 113, e.g., to provide multiple cameras to image capture device 100.

In some examples, image capture device 100 may include multiple cameras (e.g., a mobile phone having one or more front-facing cameras and one or more rear-facing cameras). For instance, image capture device 100 may include a first camera, such as camera 115 that includes a 16 MP image sensor, a second camera that includes a 108 MP image sensor, and a third camera that includes a 12 MP image sensor.

In some examples, image capture device 100 may include multiple cameras facing in different directions. For example, image capture device 100 may include dual "front-facing"

cameras. Additionally, in some examples, image capture device 100 may include a "front-facing" camera, such as camera 115, and a "rear-facing" camera. In other examples, image capture device 100 may include dual "front-facing" cameras, which may include camera 115, and a "rear-facing" camera. In further examples, image capture device 100 may include three "front-facing" cameras, such as camera 115. In yet other examples, image capture device 100 may include three "front-facing" cameras, and one, two, or three "rear-facing" cameras. Further, a person of skill in the art would appreciate that the techniques of this disclosure may be implemented for any type of camera and for any number of cameras of image capture device 100.

Each of the image sensors 112, including image sensor 112A, may represent an image sensor that includes processing circuitry, an array of pixel sensors (e.g., pixels) for capturing representations of light, memory, an adjustable lens (such as lens 113), and an actuator to adjust the lens. By way of example, image sensor 112A may be associated with, and may capture images through, a corresponding one of lenses 113, such as lens 113A. In other examples, additional, or alternate, ones of image sensors 112 may be associated with, and capture images through, corresponding additional ones of lenses 113.

In some instances, image sensors 112 may include a monochrome sensor (e.g., a "clear" pixel sensor) and/or a color sensor (e.g., a Bayer sensor). For example, a monochrome pixel sensor may be established through a disposition of a monochrome filter over image sensor 112A. Further, in some examples, a color pixel sensor may be established through a disposition of a color filter, such as a Bayer filter, disposed over image sensor 112A, or through a disposition of a red filter, a green filter, or a blue filter may over image sensor 112A. Various other filter patterns exist, such as red, green, blue, white ("RGBW") filter arrays; cyan, magenta, yellow, white (CMYW) filter arrays; and/or variations thereof, including proprietary or non-proprietary filter patterns.

Further, in some examples, multiple ones of lenses 113 may be associated with, and disposed over, respective subsets of image sensors 112. For instance, a first subset of sensors 112 may be allocated to a first one of lenses 113 (e.g., a wide lens camera, ultra-wide lens camera, telephoto lens camera, periscope lens camera, etc.), and a second subset of image sensors 112 may be allocated to a second one of lenses 113 distinct from the first subset. In some instances, each of lenses 113 may serve respective functions as provided by various attributes of the cameras (e.g., lens attributes, aperture attributes, angle-of-view attributes, thermal imaging attributes, etc.), and a user of image capture device 100 may leverage the various attributes of each of lenses 113 to capture one or more images or sequences of images (e.g., as in a video recording).

Image capture device 100 may further include a central processing unit (CPU) 116, an encoder/decoder 117, a graphics processing unit (GPU) 118, a local memory 120 of GPU 118, a user interface 122, a memory controller 124 that provides access to system memory 130 and to instruction memory 132, and a display interface 126 that outputs signals that causes graphical data to be displayed on display 128.

Additionally, in some instances, image capture device 100 may receive user input via user interface 122, and in response to the received user input, CPU 116 and/or camera processor 114 may activate respective ones of lenses 113, or combinations of lenses 113. For example, the received user input may corresponding a user selection of lens 113A (e.g., a fisheye lens), and based on the received user input, CPU 116 may select an initial one of lenses 113 to activate and additionally, or alternatively, may transition from the initially selected lens to another one of lenses 113.

In other examples, CPU 116 and/or camera processor 114 may detect an operating condition that satisfies certain lens-selection criteria (e.g., digital zoom level satisfying a predefined camera transition threshold, a change in lighting conditions, input from a user calling for a particular lens 13, etc.), and may select the initial one of lenses 113, such as lens 113A, for activation based on the detected operating condition. In some examples, image capture device 100 may include multiple ones of camera 115, which may collectively capture one synthetic image or stream of synthetic images, such that camera processor 114 or CPU 116 may process one synthetic image or stream of synthetic images based on image data captured from sensors 112.

In some examples, each of lenses 113 and image sensors 112 may operate collectively to provide various optical zoom levels, angles of view (AOV), focal lengths, and FOVs. Further, light guides may be used to direct incident light from lenses 113 to a respective one of sensors 112, and examples of the light guides may include, but are not limited to, a prism, a moving prism, or one or more mirrors. For instance, light received from lens 113A may be redirected from image sensor 112A toward another one of image sensors 112. Further, in some instances, camera processor 114 may perform operations that cause a prism to move and redirect light incident lens 113A in order to effectively change the focal length for the received light.

Further, as illustrated in FIG. 1, a single camera processor, such as camera processor 114, may be allocated to and interface with all, or a selected subset, of image sensors 112. In other instances, multiple camera processors may be allocated to and interface with all, or a selected subset, of image sensors 112, and each of the camera processors may coordinate with one another to efficiently allocate processing resources to the all, or the selected subset, of image sensors 112. For example, and through the execution of stored instructions, camera processor 114 may implement multiple processing algorithms under various circumstances to perform digital zoom operations or other image processing operations.

Although the various components of image capture device 100 are illustrated as separate components, in some examples, the components may be combined to form a system on chip (SoC). As an example, camera processor 114, CPU 116, GPU 118, and display interface 126 may be implemented on a common integrated circuit (IC) chip. In some examples, one or more of camera processor 114, CPU 116, GPU 118, and display interface 126 may be implemented in separate IC chips. Various other permutations and combinations are possible, and the techniques of this disclosure should not be considered limited to the example of FIG. 1.

System memory 130 may store program modules and/or instructions and/or data that are accessible by camera processor 114, CPU 116, and GPU 118. For example, system memory 130 may store user applications (e.g., instructions for the camera application) and resulting images from camera processor 114. System memory 130 may additionally store information for use by and/or generated by other components of image capture device 100. For example, system memory 130 may act as a device memory for camera processor 114. System memory 130 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media, cloud-based storage medium, or an optical storage media.

Camera processor 114 may store data to, and read data from, system memory 130. For example, camera processor 114 may store a working set of instructions to system memory 130, such as instructions loaded from instruction memory 132. Camera processor 114 may also use system memory 130 to store dynamic data created during the operation of image capture device 100.

Similarly, GPU 118 may store data to, and read data from, local memory 120. For example, GPU 118 may store a working set of instructions to local memory 120, such as instructions loaded from instruction memory 132. GPU 118 may also use local memory 120 to store dynamic data created during the operation of image capture device 100. Examples of local memory 120 include one or more volatile or non-volatile memories or storage devices, such as RAM, SRAM, DRAM, EPROM, EEPROM, flash memory, a magnetic data media, a cloud-based storage medium, or an optical storage media.

Instruction memory 132 may store instructions that may be accessed (e.g., read) and executed by one or more of camera processor 114, CPU 116, and GPU 118. For example, instruction memory 132 may store instructions that, when executed by one or more of camera processor 114, CPU 116, and GPU 118, cause one or more of camera processor 114, CPU 116, and GPU 118 to perform one or more of the operations described herein. For instance, instruction memory 132 can include segmentation model data 133 that can include instructions that, when executed by one or more of camera processor 114, CPU 116, and GPU 118, cause camera processor 114, CPU 116, and GPU 118 to execute a corresponding segmentation model (e.g., semantic segmentation model), such as the segmentation model described herein. The segmentation model may be any suitable image segmentation model, such as any suitable convolutional neural network (CNN). In some examples, segmentation model data 133 characterizes a semantic segmentation model that includes an encoder and a decoder. For example, segmentation model data 133 can include encoder model data 132A and decoder model data 132B. When executed by one or more of camera processor 114, CPU 116, and GPU 118, encoder model data 132A causes camera processor 114, CPU 116, and GPU 118 to execute a corresponding encoder of the segmentation model. Similarly, when executed by one or more of camera processor 114, CPU 116, and GPU 118, decoder model data 132B causes camera processor 114, CPU 116, and GPU 118 to execute a corresponding decoder of the segmentation model.

Instruction memory 132 can also include cross-reference model data 132C and blender model data 132D. Cross-reference model data 132C may include instructions that, when executed by one or more of camera processor 114, CPU 116, and GPU 118, cause camera processor 114, CPU 116, and GPU 118 to execute a corresponding cross-reference model, such as the cross-reference model described herein. Blender model data 132D may include instructions that, when executed by one or more of camera processor 114, CPU 116, and GPU 118, cause camera processor 114, CPU 116, and GPU 118 to blend segmentation data, such as to blend the image segmentation data and the reference segmentation data, as described herein. For instance, one or more of camera processor 114, CPU 116, and GPU 118 may execute blender model data 132D instructions to alpha-blend image segmentation data with reference segmentation data to generate output segmentation data.

Each of segmentation model data 133, encoder model data 132A, decoder model data 132B, cross-reference model data 132C, and blender model data 132D may further include, in some examples, one or more corresponding configuration parameters, hyperparameters, and weights. Instruction memory 132 may also store instructions that, when executed by one or more of camera processor 114, CPU 116, and GPU 118, cause one or more of camera processor 114, CPU 116, and GPU 118 to perform image processing operations, such as one or more of automatic focus (AF), automatic exposure (AE), automatic gain (AG), or automatic white balance (AWB). Instruction memory 130 may include read-only memory (ROM) such as EEPROM, flash memory, a removable disk, CD-ROM, any non-volatile memory, any non-volatile memory, or any other suitable memory.

The various components of image capture device 100, as illustrated in FIG. 1, may be configured to communicate with each other across bus 135. Bus 135 may include any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus), or another type of bus or device interconnect. It is to be appreciated that the specific configuration of components and communication interfaces between the different components shown in FIG. 1 is merely exemplary, and other configurations of the components, and/or other image processing systems with the same or different components, may be configured to implement the operations and processes of this disclosure.

Camera processor 114 may be configured to receive image frames (e.g., pixel data, image data) from image sensors 112, and process the image frames to generate image and/or video content. For example, image sensor 112A may be configured to capture individual frames, frame bursts, frame sequences for generating video content, photo stills captured while recording video, image previews, or motion photos from before and/or after capture of a still photograph. CPU 116, GPU 118, camera processor 114, or some other circuitry may be configured to process the image and/or video content captured by image sensor 112A into images or video for display on display 128. In an illustrative example, CPU 116 may cause image sensor 112A to capture image frames, and may receive pixel data from image sensor 112A. In the context of this disclosure, image frames may generally refer to frames of data for a still image or frames of video data or combinations thereof, such as with motion photos. Camera processor 114 may receive, from image sensors 112, pixel data of the image frames in any suitable format. For instance, the pixel data may be formatted according to a color format such as RGB, YCbCr, or YUV.

In some examples, camera processor 114 may include an image signal processor (ISP). For instance, camera processor 114 may include an ISP that receives signals from image sensors 112, converts the received signals to image pixels, and provides the pixel values to camera processor 114. Additionally, camera processor 114 may be configured to perform various operations on image data captured by image sensors 112, including auto gain, auto white balance, color correction, or any other image processing operations.

Memory controller 124 may be communicatively coupled to system memory 130 and to instruction memory 132. Memory controller 124 may facilitate the transfer of data going into and out of system memory 130 and/or instruction memory 132. For example, memory controller 124 may receive memory read and write commands, such as from camera processor 114, CPU 116, or GPU 118, and service such commands to provide memory services to system memory 130 and/or instruction memory 132. Although memory controller 124 is illustrated in the example of FIG. 1 as being separate from both CPU 116 and system memory 130, in other examples, some or all of the functionality of memory controller 124 with respect to servicing system memory 130 may be implemented on one or both of CPU 116 and system memory 130. Likewise, some or all of the functionality of memory controller 124 with respect to servicing instruction memory 132 may be implemented on one or both of CPU 116 and instruction memory 132.

Camera processor 114 may also be configured, by executed instructions, to analyze image pixel data and store resulting images (e.g., pixel values for each of the image pixels) to system memory 130 via memory controller 124. Each of the images may be further processed for generating a final image for display. For example, GPU 118 or some other processing unit, including camera processor 114 itself, may perform color correction, white balance, blending, compositing, rotation, digital zoom, or any other operations to generate the final image content for display.

In addition, image capture device 100 may include a video encoder and/or video decoder 117, either of which may be integrated as part of a combined video encoder/decoder (CODEC). Encoder/decoder 117 may include a video coder that encodes video captured by one or more camera(s) 115 or a decoder that decodes compressed or encoded video data. In some instances, CPU 116 may be configured to encode and/or decode video data using encoder/decoder 117.

CPU 116 may comprise a general-purpose or a special-purpose processor that controls operation of image capture device 100. A user may provide input to image capture device 100 to cause CPU 116 to execute one or more software applications. The software applications executed by CPU 116 may include, for example, a camera application, a graphics editing application, a media player application, a video game application, a graphical user interface application or another program. For example, and upon execution by CPU 116, a camera application may allow the user to control various settings of camera 115, e.g., via input provided to image capture device 100 via user interface 122. Examples of user interface 122 include, but are not limited to, a pressure-sensitive touchscreen unit, a keyboard, a mouse, or an audio input device, such as a microphone. For example, user interface 122 may receive input from the user to adjust desired zoom levels (e.g., digital zoom levels), alter aspect ratios of image data, record video, take a snapshot while recording video, apply filters when capturing images, select a region-of-interest (ROI) (e.g., a FOZ) for AF, AE, AG, or AWB operations, record slow motion video or super slow motion video, apply night shot settings, and/or capture panoramic image data, among other examples.

By way of example, the executed camera application may cause CPU 116 to generate content that is displayed on display 128. For instance, display 128 may display information such as a preview of an image as captured by one or more of sensors 112, a configured light intensity, whether flash is enabled, and other such information. The user of image capture device 100 may interface with display 128 (e.g., via user interface 122) to configure the manner in which the images are generated (e.g., with or without flash, focus settings, exposure settings, gain settings, white balance settings, as well as other settings or parameters). The executed camera application may also cause CPU 116 to instruct camera processor 114 to process the images captured by sensor 112A in a user-defined manner. For example, CPU 116 may instruct camera processor 114 to perform a zoom operation on the images captured by one or more of sensors 112, e.g., in response to a request to zoom provided by the user via user interface 122.

As described herein, one or more of CPU 116 and GPU 118 may perform operations that apply a process, such as a trained machine learning process such as the segmentation model characterized by segmentation model data 133 stored in instruction memory 132, to a frame of image data captured by one or more of image sensors 112 to generate image feature data and image segmentation data. For instance, one or more of image sensors 112 may capture an image that includes a skyline in the background, and persons or objects in the foreground. CPU 116 may input elements of the captured image to an encoder characterized by encoder model data 132A to generate and output image feature data characterizing features of the captured image (e.g., multi-scale features). Further, CPU 116 may input elements of the image feature data to a decoder characterized by decoder model data 132B to generate and output image segmentation data, which characterizes segments of the captured image.

Further, CPU 116 may obtain reference feature data that identifies and characterizes features of each of a plurality of reference images. For instance, the reference feature data may be stored in system memory 130. CPU 116 may obtain the reference feature data from system memory 130. In some examples, CPU 116 may generate the reference feature data in real-time. For example, CPU 116 may obtain the plurality of reference images from system memory 130, and may input elements of the plurality of reference images to the encoder characterized by encoder model data 133 to generate and output the reference feature data. CPU 116 may also obtain, from system memory 130, reference classification data identifying and characterizing a classification (e.g., label) of each pixel of the plurality of reference images.

In some examples, the plurality of reference images may include images captured from one or more devices, such as one or more image capture devices 100, and stored in a data repository, such as a cloud-based data repository, for instance. Image capture device 100 may retrieve the plurality of reference images from the data repository, and may store the plurality of reference images within system memory 130. Image capture device 100 may then obtain the plurality of reference images from system memory 130, and generate the reference feature data.

Further, CPU 116 may input elements of the reference feature data, the reference classification data, and the input feature data to a cross-reference model, such as the cross-reference model characterized by cross-reference model data 132C, to generate and output reference segmentation data. The reference segmentation data may characterize segments of each of the plurality of reference images. Moreover, the cross-reference model does not need to be trained.

CPU 116 may also perform operations to blend the input segmentation data and the reference segmentation data to generate blended segmentation data. For example, the CPU 116 may execute a blender model, such as the blender model characterized by blender model data 132D, to alpha-blend the input segmentation data with the reference segmentation data to generate the blended segmentation data. The blended segmentation data may include, for each of a plurality of classifications, a classification value corresponding to each pixel of the captured image. Further, CPU 116 may generate final segmentation data characterizing, for each pixel, a corresponding class. The corresponding class of each pixel may be, for example, one with a largest predicted probability as indicated by the classification values. For example, CPU 116 may perform operations to determine an "argmax" of the blended segmentation data to generate the final segmentation data characterizing the class for each pixel. CPU 116 may then provide the final segmentation data as an output.

In some instances, CPU 116 may perform operations to train the segmentation model based on features generated from a plurality of images, such as the plurality of reference images stored in system memory 130 or within a cloud-based data repository, for example. For instance, CPU 116 may obtain the plurality of images, and generate feature data characterizing at least portions of the plurality of images. CPU 116 may input the features into the segmentation model during training. The training may be supervised, such that the generated features include data characterizing desired output segmentation data. In some examples, and during training of the segmentation model, CPU 116 may generate additional features based on the output reference segmentation data generated by the cross-reference model, and may input the additional features to the segmentation model. The additional features may serve as prior information to help fine-tune the segmentation model.

Figure 2:
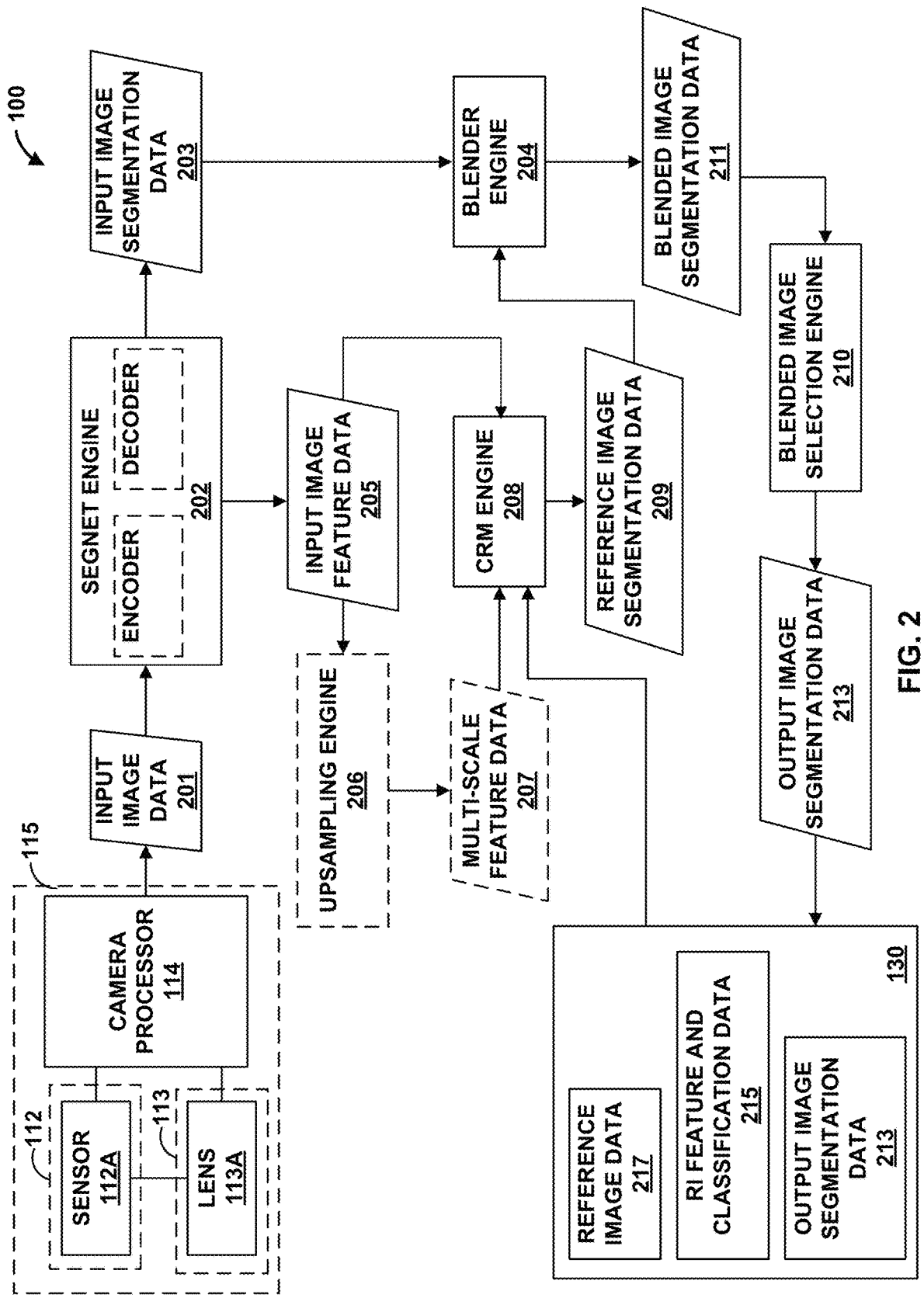
FIGS. 2, 3A, and 3B are block diagrams illustrating portions of an exemplary image segmentation device, according to some implementations.

FIG. 2 is a block diagram illustrating exemplary portions of the image capture device 100 of FIG. 1. In this example, image capture device 100 includes a segnet engine 202, a blender engine 204, an upsampling engine 206, a cross-reference model (CRM) engine 208, and a blended image selection engine 210. One or more of segnet engine 202, blender engine 204, upsampling engine 206, CRM engine 208, and blended image selection engine 210 may, in some examples, be implemented in hardware. In some examples, one or more of segnet engine 202, blender engine 204, upsampling engine 206, CRM engine 208, and blended image selection engine 210 may be implemented as executable instructions stored within instruction memory 132 that can be executed by, for example, one or more of CPU 116 and GPU 118.

As illustrated, one or more cameras 115 may capture an image (e.g., via lens 113A) and may generate input image data 201 characterizing the image. In some examples, input image data 201 represents one or more channels, such one or more of RGB, YCbCr, or YUV color channels. Segnet engine 202 may receive input image data 201, and may apply a process, such as the segmentation model characterized by segmentation model data 133, to the input image data 201 to generate elements of input image segmentation data 203 that characterize a segmentation of the captured image. For example, segnet engine 202 may obtain encoder model data 132A from instruction memory 132, and may configure an encoder of the segmentation model with one or more of the configuration parameters, hyperparameters, and/or weights characterized and identified by the encoder model data 132A. Similarly, segnet engine 202 may obtain decoder model data 132B from instruction memory 132, and may configure a decoder of the segmentation model with one or more of the configuration parameters, hyperparameters, and/or weights characterized and identified by the decoder model data 132B. Further, segnet engine 202 may execute the trained and configured segmentation model, causing the trained and configured segmentation model to ingest elements of the input image data 201 and generate the elements of input image segmentation data 203. For instance, in some examples, input image segmentation data 203 may identify and characterize logit values for each of a plurality of color channels, such as RGB, YCbCr, or YUV color channels, of the captured image.

Segnet engine 202 may also generate and output input image feature data 205, which characterizes features of the captured image. For instance, the encoder of the executed segmentation model may ingest elements of the input image data 201, and may output elements of the input image feature data 205. In some examples, upsampling engine 206 may receive input image feature data 205, and may perform operations to upsample the input image featured data 205 to generate multi-scale feature data 207. For instance, input image featured data 205 may characterize an increase in the resolution of input image feature data 205. In some examples, upsampling engine 206 upsamples the input image feature data 205 in accordance with a resolution of multi-scale feature data 207 expected by CRM engine 208, such as in accordance with a resolution of reference image data 217 or reference image feature and classification data 215, as discussed below.

CRM engine 208 may receive input image feature data 205 from segnet engine 202 or, in some examples when upsampling engine 206 is employed, may receive multi-scale feature data 207 from upsampling engine 206. Further, CRM engine 208 may execute a cross-reference model, such as the CRM model characterized by CRM model data 132C, to generate elements of reference image segmentation data 209, which characterizes a segmentation of a plurality of reference images (e.g., three reference images). For instance, CRM engine 208 may obtain, from system memory 130, reference image (RI) feature and classification data 215, which characterizes features and classifications of each of a plurality of reference images. RI feature and classification data 215 may include, for example, a feature value and a classification value for each pixel of each reference image. CRM engine 208 may execute the CRM model, causing the CRM model to ingest elements of the input image feature data 205 and the RI feature and classification data 215, and generate elements of reference image segmentation data 209 characterizing a segmentation of the plurality of reference images, as described herein. For instance, in some examples, reference image segmentation data 209 may identify and characterize logit values for each of a plurality of color channels, such as RGB, YCbCr, or YUV color channels, of each of the plurality of reference images. As described herein, the cross-reference model does not need to be trained.

In some examples, when upsampling engine 206 is employed, CRM engine 208 may execute the CRM model, causing the CRM model to ingest elements of the multi-scale feature data 207 and the RI feature and classification data 215, and generate elements of the reference image segmentation data 209. In some instances, upsampling engine 206 upsamples input image feature data 205 to generate multi-scale feature data 207 with a pixel resolution corresponding to a resolution of RI feature and classification data 215 and/or input image segmentation data 203.

In some examples, CRM engine 208 applies a trained machine learning process to a plurality of reference images to determine the features of the plurality of reference images (e.g., in real-time). For instance, CRM engine 208 may obtain reference image data 217 from system memory 130, which identifies and characterizes a plurality of reference images. CRM engine 208 may execute the encoder of the segmentation model to ingest elements of reference image data 217 and generate a feature value for each pixel of each of the plurality of reference images. Because the CRM engine 208 employs the same, or another instance of, the encoder of the segmentation model, no additional training of the encoder is performed, at least in some examples. CRM engine 208 may obtain the classification values corresponding to the plurality of reference images from system memory 130, and may generate reference image segmentation data 209 as described herein. Thus, for example, image capture device 100 may employ the encoder of the segmentation model (e.g., as characterized by encoder model data 132A), or instances of the same encoder, to generate features for both the captured image and the reference images.

Blender engine 204 may execute a blending model (e.g., algorithm), such as the blender model characterized by blender model data 132D, to blend input image segmentation data 203 with reference image segmentation data 209 to generate elements of blended image segmentation data 211. For instance, blender engine 204 may perform operations to alpha-blend logit values of the input image segmentation data 203 with logit values of the reference image segmentation data 209. Blended image segmentation data 211 may include a blended segmentation for each of a plurality of color channels, such as RGB, YCbCr, or YUV color channels.

Blended image selection engine 210 may receive blended image segmentation data 211 from blender engine 204, and may perform operations to select, for each pixel, a most probable classification (e.g., the class with the largest predicted probability). For instance, blend image selection engine 210 may perform operations to apply an "argmax" function to blended image segmentation data 211 to determine the most probably classification for each pixel. Blend image selection engine 210 may generate output image segmentation data 213 identifying and characterizing the selected class for each pixel of each of the plurality of color channels. Blended image selection engine 210 may store output image segmentation data 213 in, for example, system memory 130.

Figure 3A:
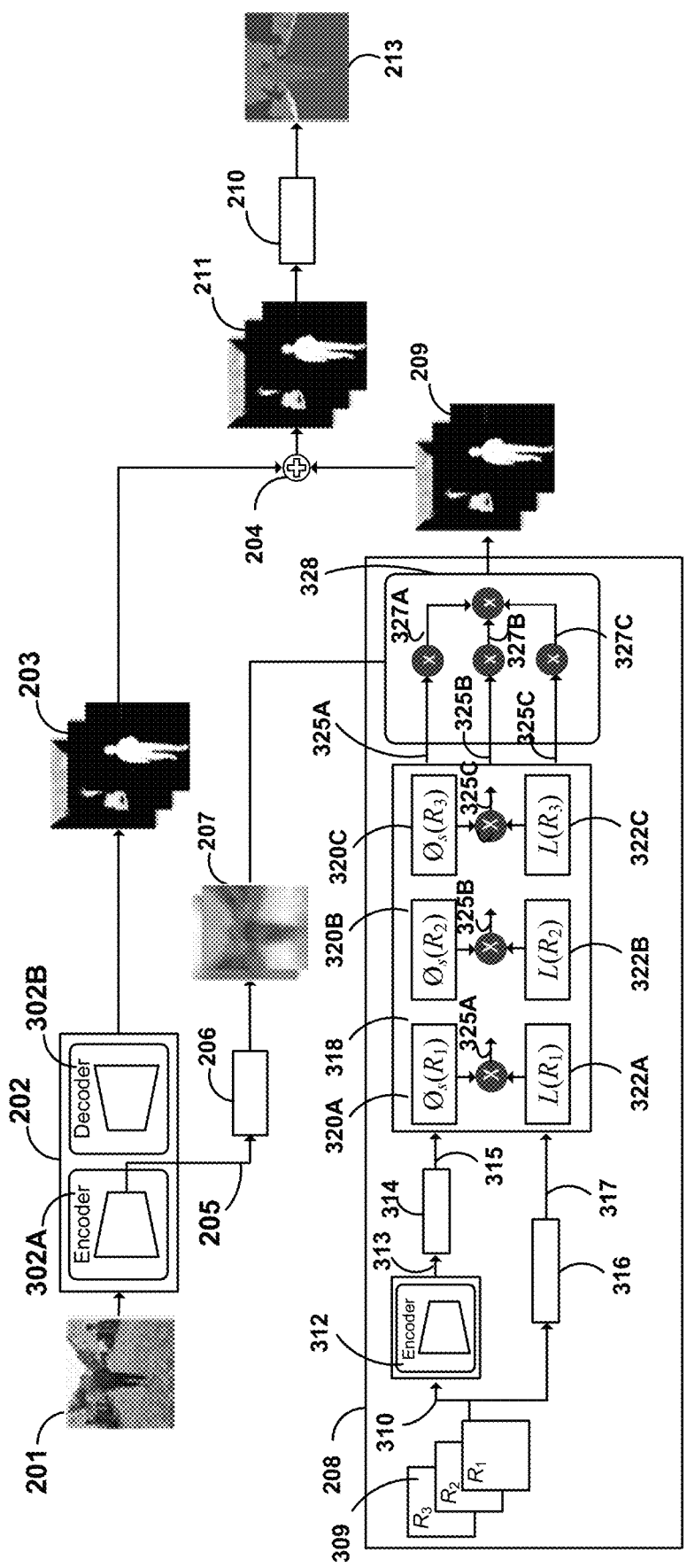
Figure 3B:
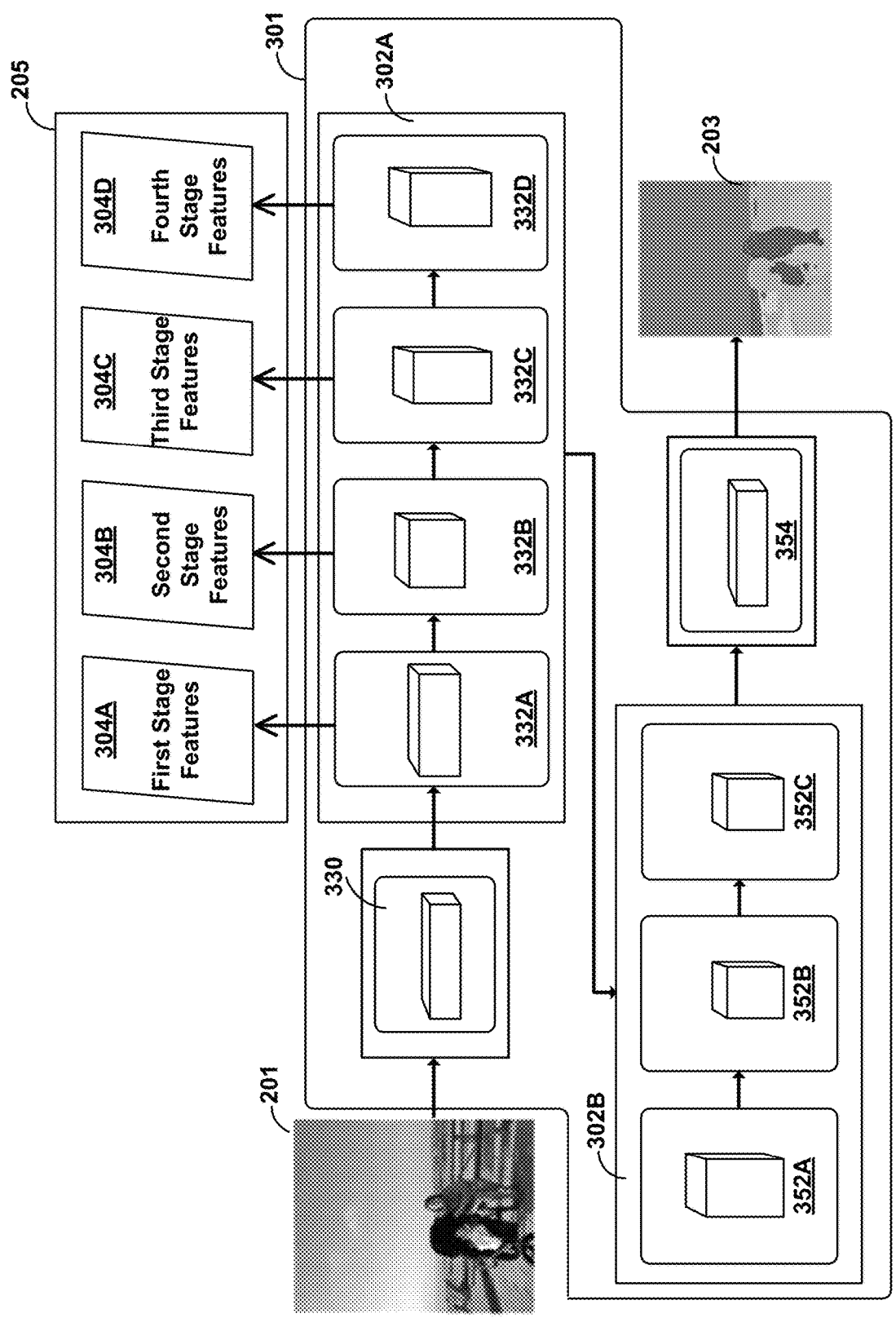

FIGS. 3A and 3B illustrate block diagrams of exemplary portions of the image capture device 100 of FIG. 2. With reference to FIG. 3A, segnet engine 202 may execute a segmentation model that includes an encoder 302A and a decoder 302B. As described herein, encoder 302A may ingest elements of input image data 201 to generate elements of input image feature data 205 characterizing features of input image data 201, and decoder 302B may generate elements of input image segmentation data 203 based on the elements of input image feature data 205 generated by encoder 302A. Input image segmentation data 203 may characterize a segmentation of the input image data 201.

Further, CRM engine 208 generates elements of reference image data 310 of a plurality of reference images 309 (e.g., reference images R1, R2, and R3), and may cause an encoder 312 to ingest the elements of reference image data 310 and generate reference feature data 313 for each of the plurality of reference images 309. In some examples, encoder 312 may be the same, or another instance of, encoder 302A. As such, encoder 312 does not require additional training, at least in some implementations.

In this example, upsampling module 314 upsamples the elements of reference feature data 313 for each of the plurality of reference images 309 to generate corresponding upsampled feature data 315 for each pixel of each of the plurality of reference images 309. For instance, upsampled feature data 315 may include first upsampled feature data 320A for reference image R1, second upsampled feature data 320B for reference image R2, and third upsampled feature data 320C for reference image R3.

In addition, a classification module 316 receives the elements of reference image data 310 and assigns a classification 317 (e.g., a value identifying a probability that a pixel is of a particular classification) to each pixel of the plurality of reference images 309. In some implementations, the classification 317 for each pixel is predetermined and stored within memory, such as within system memory 130. For instance, the classifications 317 may include first classification data 322A for reference image R1, second classification data 322B for reference image R2, and third classification data 322C for reference image R3.

A CRM module 318 determines, for each of the plurality of reference images 309, CRM output data 325A, 325B, 325C (e.g., CRM values). For instance, CRM module 318 may determine first CRM output data 325A based on first upsampled feature data 320A and first classification data 322A. Similarly, CRM module 318 may determine second CRM output data 325B based on second upsampled feature data 320B and second classification data 322B, and third CRM output data 325C based on third upsampled feature data 320C and third classification data 322C. In some implementations, CRM module 318 determines CRM values based on multiplying the corresponding upsampled feature data and classification data. For example, CRM module 318 may perform operations to multiply a matrix characterized by first upsampled feature data 320A with a matrix characterized by first classification data 322A (e.g., matrix multiplication) to generate first CRM output data 325A for reference image R1. Similarly, CRM module 318 may perform operations to multiply a matrix characterized by second upsampled feature data 320B with a matrix characterized by second classification data 322B to generate second CRM output data 325B for reference image R2. CRM module 318 may also perform operations to multiply a matrix characterized by third upsampled feature data 320C with a matrix characterized by third classification data 322C to generate third CRM output data 325C for reference image R3. First CRM output data 325A, second CRM output data 325B, and third CRM output data 325C may characterize matrices, where each value of each matrix corresponds to a pixel of a reference image, for example.

Additionally, a segmentation output module 328 generates reference image segmentation data 209 based on first CRM output data 325A, second CRM output data 325B, third CRM output data 325C, and multi-scale feature data 207. For example, segmentation output module 328 may generate first segmentation data 327A based on first CRM output data 325A and multi-scale feature data 207. Similarly, segmentation output module 328 may generate second segmentation data 327B based on second CRM output data 325B and multi-scale feature data 207, and may also generate third segmentation data 327C based on third CRM output data 325C and multi-scale feature data 207.

In some implementations, segmentation output module 328 performs operations to multiply a matrix characterized by first CRM output data 325A with a matrix characterized by multi-scale feature data 207 to generate first segmentation data 327A for reference image R1. Similarly, segmentation output module 328 may perform operations to multiply a matrix characterized by second CRM output data 325B with the matrix characterized by multi-scale feature data 207 to generate second segmentation data 327B for reference image R2. Segmentation output module 328 may also perform operations to multiply a matrix characterized by third CRM output data 325C with the matrix characterized by multi-scale feature data 207 to generate third segmentation data 327C for reference image R3.

For example, each of first CRM output data 325A, second CRM output data 325B, and third CRM output data 325C may characterize a "probability map" of different classes for each pixel of the plurality of reference images 309, where each probability map is generated for a corresponding multi-scale feature identified within multi-scale feature data 207. Segmentation output module 328 may generate, for each of first CRM output data 325A, second CRM output data 325B, and third CRM output data 325C, a plurality of segmentation masks based on the corresponding probability maps and the multi-scale features. For instance, segmentation output module 208 may multiply each probability map with its corresponding multi-scale features to generate the corresponding segmentation mask. As such, each segmentation mask may capture a different aspect of the input image data 201. Segmentation output module 328 may then combine (e.g., sum) the corresponding segmentations masks to generate matrices for each of first segmentation data 327A, second segmentation data 327B, and third CRM output data 327C.

Further, segmentation output module 328 may generate reference image segmentation data 209 based on first segmentation data 327A, second segmentation data 327B, and third segmentation data 327C. For example, segmentation output module 328 may perform operations to multiply matrices characterized by first segmentation data 327A, second segmentation data 327B, and third segmentation data 327C to generate reference image segmentation data 209.

Blender engine 204 may perform operations to blend input image segmentation data 203 and reference image segmentation data 209 to generate blended image segmentation data 211, as described herein. For example, blender engine 204 may perform operations to alpha-blend input image segmentation data 203 with reference image segmentation data 209 to generate blended image segmentation data 211. Further, blended image selection engine 210 may perform operations to determine output image segmentation data 213 identifying and characterizing a classification for each pixel of blended image segmentation data 211. For instance, and as described herein, blended image selection engine 210 may perform operations to determine an "argmax" value for each pixel of blended image segmentation data 211, and may output the pixel values as output image segmentation data 213.

FIG. 3B illustrates further details of an exemplary segmentation model 301, such as one characterized by segmentation model data 133, and that may be executed by segnet engine 202. The segmentation model 301 may be, for example, a CNN. In this example, an initial stage 330 of segmentation model 301 receives elements of input image data 201. The initial stage 330 may be, for example, a normalization layer of the segmentation model 301. The segmentation model 301 also includes encoder 302A, decoder 302B, and a final segmentation layer 354. Encoder 302A may include a first stage 332A, a second stage 332B, a third stage 332C, and a fourth stage 332D. Each of the first stage 332A, second stage 332B, third stage 332C, and fourth stage 332D may include a pooling layer and/or a convolution layer. In some examples, each pooling layer pools a number of pixels (e.g., neighboring pixels), such as four pixels. In other examples, each pooling layer can pool any number of suitable pixels. As such, earlier stages of encoder 302A may capture more detailed features than later stages, while later stages may preserve more object level areas of the image than earlier stages.

Executed segmentation model 301 outputs features at each of the first stage 332A, second stage 332B, third stage 332C, and fourth stage 332D. For example, first stage 332A outputs first stage features 304A, second stage 332B outputs second stage features 304B, third stage 332C outputs third stage features 304C, and fourth stage 332D outputs fourth stage features 304D. The first stage features 304A, second stage features 304B, third stage features 304C, and fourth stage features 304D may from part of, or all of, input image feature data 205, for example.

Decoder 302B may include a first stage 352A, a second stage 352B, an a third stage 352C. Each of the first stage 352A, second stage 352B, and third stage 352C may include an upsampling layer and a convolution layer. Final segmentation layer 354, which may be a softmax or argmax layer, may perform operations to provide input image segmentation data 203 based on the output of third stage 352C. As described herein, input image segmentation data 203 may characterize a segmentation of input image data 201.

Figure 4:
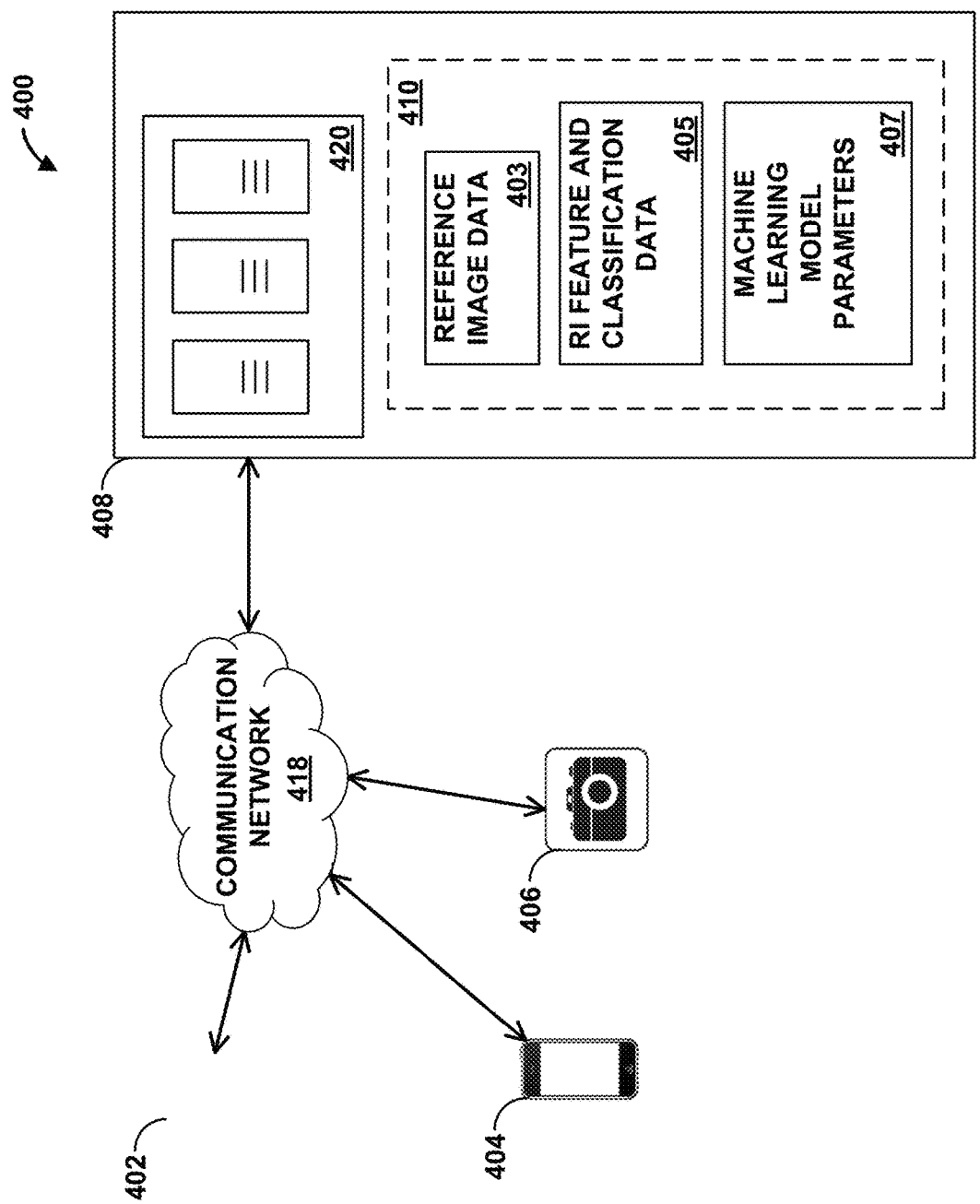
FIG. 4 is a block diagram illustrating an image segmentation system, according to some implementations.

FIG. 4 illustrates an image segmentation system 400 that includes a plurality of devices 402, 404, 406, each of which may be an example of image capture device 100. For instance, image capture device 100 may be a VR or AR headset 402, a smartphone 404, or a digital camera 406. Image segmentation system 400 also includes at least one cloud-based datacenter 408. Each cloud-based datacenter 408 includes a plurality of servers 420 and a data repository 410. Each of the plurality of servers 420 may store data to, and read data from, data repository 410. For example, data repository 410 may store reference image data 403 characterizing a plurality of reference images, RI feature and classification data 405 characterizing features and classifications of each of the plurality of reference images, and machine learning model parameters 407, such as configuration parameters, hyperparameters, and/or weights associated with a trained segmentation model.

Additionally, each of the devices 402, 404, 406 can communicate with datacenter 408 over a communication network 418. Communication network 418 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 418 can provide access to, for example, the Internet.

In some examples, one or more qualified persons, such as an imaging engineer, review various reference images on a computing device, such as an image capture device 100, a server, a laptop, or any other suitable computing device, and provide input to the computing device to label (e.g., classify) each of the reference images. The computing device may then upload the reference images and labels to 15/892,844408 as reference image data 403 and classification labels within RI feature and classification data 405.

In some instances, the reference images may include types of captured images that may typically lead to subpar segmentation results. For example, the reference images may include scenes that are noisy or blurry and under low-light conditions, images captured under specific ISP settings, or images in specific segmentation categories. In some examples, the reference images are separated into different pools based on the various types of images. Each of the devices 402, 404, 406 may obtain, from datacenter 408, reference image data 403 and corresponding RI feature classification data 405 for a particular pool of reference images based on the device's own conditions (e.g., conditions matching, or most equivalent to, the particular pool of reference images).

In some implementations, devices 402, 404, 406 detect when a segmentation output (e.g., input image segmentation data 203) of a captured image represents a low confidence map (e.g., when the classification labels are below a threshold), and may upload the captured image as a reference image to datacenter 408. In some instances, the devices 402, 404, 406 may execute an additional machine learning model to determine the classification labels for the reference images. In some instances, the devices 402, 404, 406 may present thorough a display a user interface of a drawing software program, whereby a user provides input to the devices 402, 404, 406 to classify a captured image. The devices 402, 404, 406 may then upload the captured image as reference image data 403, and the classification labels as RI feature and classification data 405.

In yet other implementations, each of the devices 402, 404, 406 can upload RI feature and classification data 405 to datacenter 408, and can also upload model parameters, such as segmentation model parameters, as machine learning model parameters 407 to datacenter 408. As such, devices 402, 404, 406 do not upload the corresponding captured images to datacenter 408, and instead remain local to each device 402, 404, 406.

Figure 5:
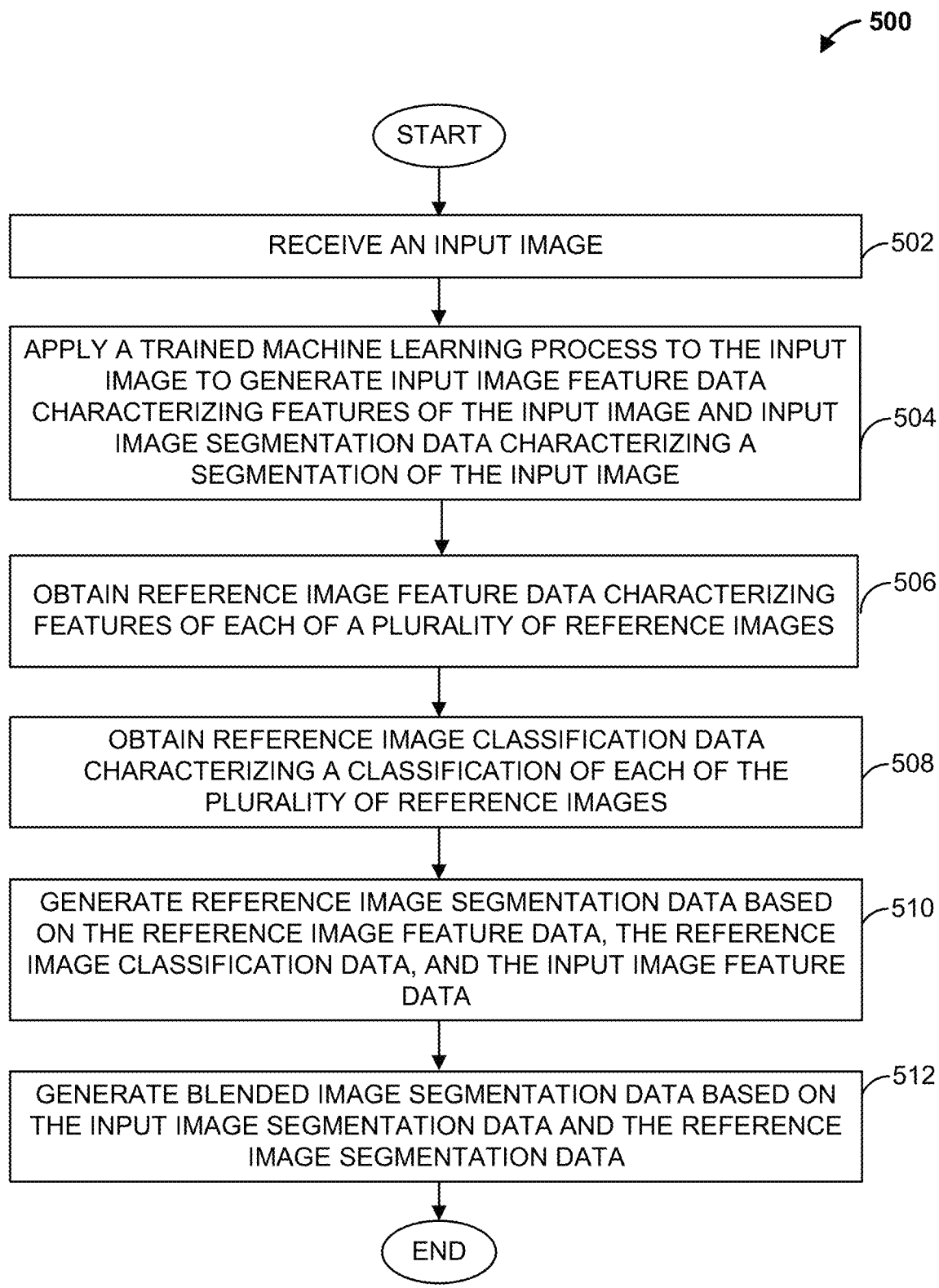
FIG. 5 is a flowchart of an exemplary process for applying trained machine learning processes to image data to segment an image, according to some implementations.

FIG. 5 is a flowchart of an example process 500 for segmenting an image. Process 500 may be performed by one or more processors executing instructions locally at a computing device, such as by one or more of camera processor 114, CPU 116, and GPU 118 of image capture device 100 of FIG. 1. Accordingly, the various operations of process 500 may be represented by executable instructions held in storage media of one or more computing platforms, such as instruction memory 132 of image capture device 100.

At step 502, image capture device 100 receives an input image. For example, the image capture device may capture an image of a scene that includes a skyline, a person, and one or more additional objects, such as trees. At step 504, the image capture device applies a process, such as a trained machine learning process, to the input image to generate input image feature data characterizing features of the input image, and input image segmentation data characterizing a segmentation of the input image. For example, image capture device 100 may obtain, from instruction memory 132, segmentation model data 133 characterizing configuration parameters, hyperparameters, and/or weights for a trained segmentation model, and may configure a segmentation model based on the obtained configuration parameters, hyperparameters, and/or weights. Further, image capture device 100 executes the configured segmentation model and inputs elements of input image data 201 to the executed segmentation model that generates input image data 205 and input image segmentation data 203, for instance.

Further, and at step 506, image capture device 100 obtains reference image feature data characterizing features of each of a plurality of reference images. At step 508, image capture device 100 obtains image classification data characterizing a classification of each of the plurality of reference images. For example, image capture device 100 may obtain, from system memory 130, RI feature and classification data 215 characterizing feature and classification values for a plurality of reference images, such as reference images characterized by reference image data 213. In some examples, image capture device 100 obtains RI feature and classification data 215 corresponding to a particular image type, such as reference images taken under low light conditions, reference images captured with specific ISP settings, or reference images with specific segmentation categories.

Proceeding to step 510, the image capture device 100 generates reference image segmentation data based on the reference image feature data, the reference image classification data, and the input image feature data. The reference image segmentation data may include, for example, logit values. For instance, image capture device 100 may obtain, from instruction memory 132, cross-reference model data 132C characterizing a CRM model, and may execute the CRM model. Further, image capture device 100 may input elements of input image feature data 205 (or, in some examples, multi-scale feature data 207), as well as elements of RI feature and classification data 215, to the executed CRM model which generates and outputs reference image segmentation data 209.

For instance, RI feature and classification data 215 may characterize a first feature matrix and a first classification matrix for a first reference image, a second feature matrix and a second classification matrix for a second reference image, and a third feature matrix and a third classification matrix for a third reference image. The executed CRM model may multiply the first feature matrix with the first classification matrix to generate a first RI matrix. Similarly, the executed CRM model may multiply the second feature matrix with the second classification matrix to generate a second RI matrix, and may multiply the third feature matrix with the third classification matrix to generate a third RI matrix. Further, the executed CRM model may multiply each of the first RI matrix, the second RI matrix, and the third RI matrix with an input image matrix characterized by input image feature data 205 to generate first, second, and third output matrices. The executed CRM model may then multiply the first, second, and third output matrices to generate the reference image segmentation data.

At step 512, the image capture device 100 generates blended image segmentation data based on the input image segmentation data and the reference image segmentation data. For example, and as described herein, the image captured device 100 may obtain, from instruction memory 132, blender model data 132C characterizing a blender model, and may execute the blender model to blend input image segmentation data 203 with reference image segmentation data 209 to generate blended image segmentation data 209. In some instances, the blender model applies an alpha-blending process to alpha-blend the input image segmentation data 203 with the reference image segmentation data 209. In some examples, the image capture device 100 stores the blended image segmentation data within a data repository, such as within system 130. In some examples, the image capture device 100 transmits the blended image segmentation data to another computing device, such as a VR or an AR device.

Figure 6:
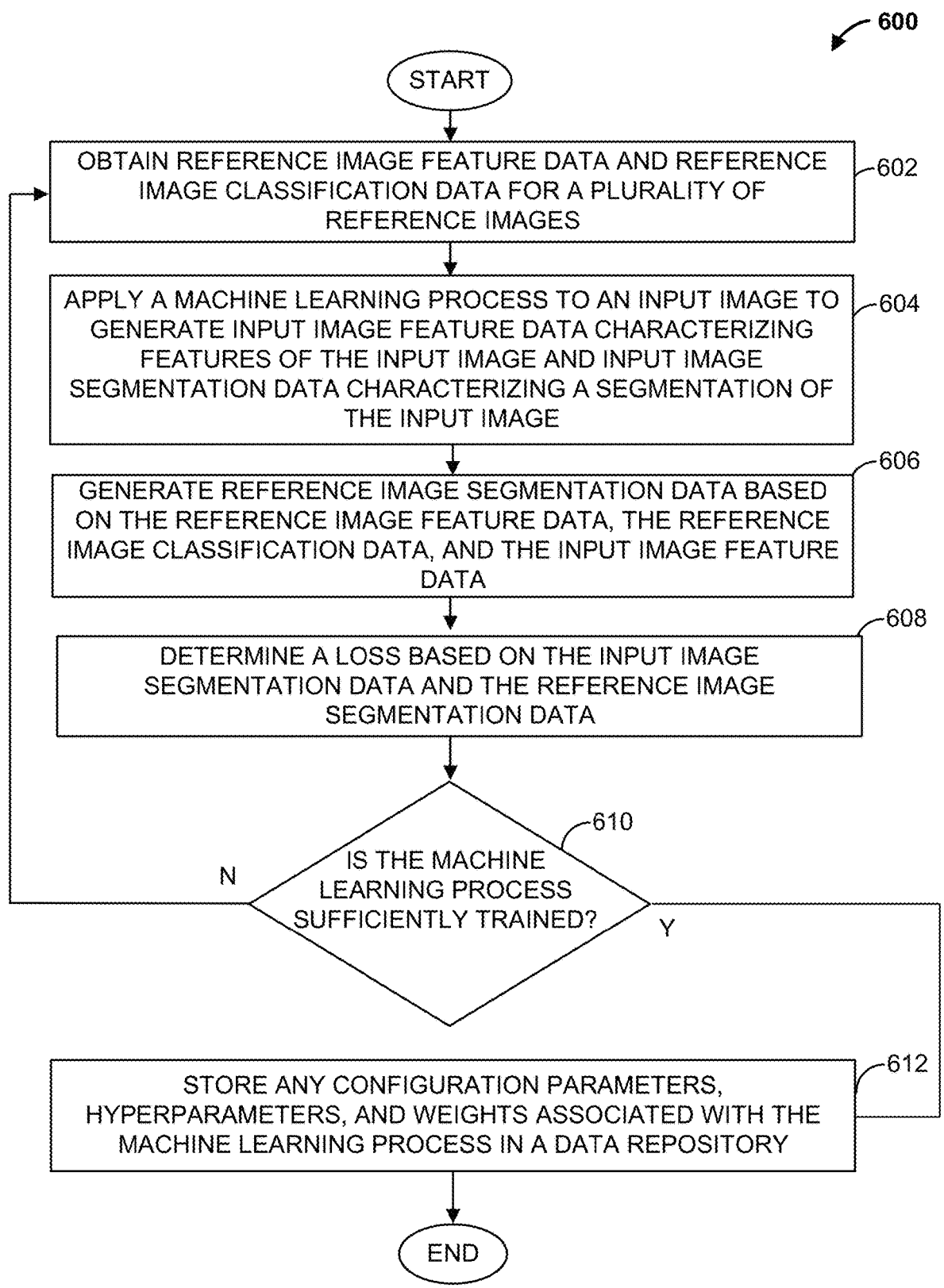
FIG. 6 is a flowchart of an exemplary process for training a machine learning process, according to some implementations.

FIG. 6 is a flowchart of an example process 600 for training a machine learning process, in accordance with one implementation. Process 600 may be performed by one or more processors executing instructions locally at a computing device, such as by one or more of camera processor 114, CPU 116, and GPU 118 of image capture device 100 of FIG. 1. Accordingly, the various operations of process 800 may be represented by executable instructions held in storage media of one or more computing platforms, such as instruction memory 132 of image capture device 100.

At step 602, the image capture device 100 obtains reference image feature data and reference image classification data for a plurality of reference images. For instance, image capture device 100 may obtain, from system memory 130, RI feature and classification data 215, which may identify and characterize features and classifications of a plurality of reference images. Further, at step 604, the image capture device 100 applies a machine learning process to an input image to generate input image feature data characterizing features of the input image, and input image segmentation data characterizing a segmentation of the input image. For example, the image capture device 100 may obtain, from instruction memory 132, segmentation model data 133 characterizing executable instructions of a segmentation model, and executes the segmentation model. Further, the executed segmentation model ingests elements of the input image, and generates and outputs the input image feature data (e.g., by an encoder of the executed segmentation model) and the input image segmentation data (e.g., by a decoder of the executed segmentation model).

Proceeding to step 606, the image capture device 100 generates reference image segmentation data based on the reference image feature data, the reference image classification data, and the input image feature data. For example, image capture device 100 may obtain, from instruction memory 132, cross-reference model data 132C characterizing a CRM model, and may execute the CRM model. Further, image capture device 100 may input elements of input image feature data, as well as elements of the reference image feature data and the reference image classification data, to the executed CRM model, and, based on the inputted elements of data, the executed CRM model generates and outputs reference image segmentation data, such as reference image segmentation data 209.

Further, at step 608, the image capture device 100 may determine a loss based on the input image segmentation data and the reference image segmentation data. For instance, the image capture device 100 may apply a loss function (e.g., algorithm) to determine a cross-entropy, logarithmic loss, a mean squared loss, or any other suitable loss. At step 610, the image capture device 100 may determine whether the machine learning process, such as the untrained CNN, is sufficiently trained based on determined loss. For example, the image capture device 100 may compare determined loss to a predetermined threshold. If the first loss is at or beyond the threshold, the image capture device 100 determines that the machine learning process is not sufficiently trained and the method proceeds back to step 602 to continue training the machine learning process. If, however, the computed loss is not at or beyond the threshold, the image capture device 100 determines that the machine learning process is sufficiently trained and the method proceeds to step 612.

At step 612, the image capture device 100 stores one or more of configuration parameters, hyperparameters, and weights learned during the training in a data repository. For example, the image capture device 100 may store the one or more of configuration parameters, hyperparameters, and weights within segmentation model data 133 (e.g., encoder model data 132A and decoder model data 132B) of instruction memory 132.

Implementation examples are further described in the following numbered clauses:

1. An apparatus comprising:
    a non-transitory, machine-readable storage medium storing instructions; and
    at least one processor coupled to the non-transitory, machine-readable storage medium, the at least one processor being configured to:
    apply a process to an input image to generate input image feature data characterizing features of the input image, and input image segmentation data characterizing an initial segmentation of the input image;
    obtain, for a plurality of reference images, reference image feature data characterizing features of the plurality of reference images, and reference image classification data characterizing classifications of the plurality of reference images;
    generate reference image segmentation data based on the reference image feature data, the reference image classification data, and the input image feature data; and
    apply a blending process to the input image segmentation data and the reference image segmentation data to generate blended image segmentation data, the blended image segmentation data characterizing a final segmentation of the input image.

2. The apparatus of clause 1, wherein the at least one processor is further configured to execute the instructions to:
    generate, for each of the plurality of reference images, first reference image data based on the reference image feature data and the reference image classification data corresponding to each of the plurality of reference images; and
    generate the reference image segmentation data based on the first reference image data for each of the plurality of reference images and the input image feature data.

3. The clause of clause 2, wherein the at least one processor is further configured to execute the instructions to:
    generate, for each of the plurality of reference images, second reference image data based on the first reference image data and the input image feature data; and
    generate the reference image segmentation data based on the second reference image data for each of the plurality of reference images.

4. The apparatus of clause 3, wherein the at least one processor is further configured to execute the instructions to obtain the plurality of reference images from a data repository.

5. The apparatus of any of clauses 1-4, wherein the at least one processor is further configured to execute the instructions to obtain the reference image feature data from a data repository.

6. The apparatus of any of clauses 1-5, wherein the at least one processor is further configured to execute the instructions to apply the process to the plurality of reference images to generate the reference image feature data.

7. The apparatus of any of clauses 1-6, wherein the at least one processor is further configured to execute the instructions to display the blended image segmentation data.

8. The apparatus of any of clauses 1-7, wherein the at least one processor is further configured to execute the instructions to store the blended image segmentation data within a data repository.

9. The apparatus of any of clauses 1-8, wherein the process is a trained machine learning process, and wherein the at least one processor is further configured to execute the instructions to establish a convolutional neural network to apply the trained machine learning process to the input image.

10. The apparatus of clause 9, wherein the input image feature data is an output of an encoder of the convolutional neural network, and the input image segmentation data is an output of a decoder of the convolutional neural network.

11. The apparatus of any of clauses 1-10, wherein the at least one processor is further configured to execute the instructions to:
receive a first input from a user; and
capture the input image in response to the first input from the user.

12. The apparatus of any of clauses 1-11, wherein the apparatus is a head mounted device.

13. The apparatus of any of clauses 1-12, wherein the at least one processor is further configured to execute the instructions to apply at least one image processing operation to the input image based on the blended image segmentation data.

14. A method comprising:
applying a process to an input image to generate input image feature data characterizing features of the image, and input image segmentation data characterizing an initial segmentation of the input image;
obtaining, for a plurality of reference images, reference image feature data characterizing features of the plurality of reference images, and reference image classification data characterizing classifications of the plurality of reference images;
generating reference image segmentation data based on the reference image feature data, the reference image classification data, and the input image feature data; and
applying a blending process to the input image segmentation data and the reference image segmentation data to generate blended image segmentation data, the blended image segmentation data characterizing a final segmentation of the input image.

15. The method of clause 14, comprising:
generating, for each of the plurality of reference images, first reference image data based on the reference image feature data and the reference image classification data corresponding to each of the plurality of reference images; and generating the reference image segmentation data based on the first reference image data for each of the plurality of reference images and the input image feature data.

16. The method of clause 15, comprising:
generating, for each of the plurality of reference images, second reference image data based on the first reference image data and the input image feature data; and
generating the reference image segmentation data based on the second reference image data for each of the plurality of reference images.

17. The method of clause 16, comprising obtaining the plurality of reference images from a data repository.

18. The method of any of clauses 14-17, comprising obtaining the reference image feature data from a data repository.

19. The method of any of clauses 14-18, comprising applying the process to the plurality of reference images to generate the reference image feature data.

20. The method of any of clauses 14-19, comprising displaying the blended image segmentation data.

21. The method of any of clauses 14-20, comprising storing the blended image segmentation data within a data repository.

22. The method of any of clauses 14-21, wherein the process is a trained machine learning process, the method comprising establishing a convolutional neural network to apply the trained machine learning process to the input image.

23. The method of clause 22, wherein the input image feature data is an output of an encoder of the convolutional neural network, and the input image segmentation data is an output of a decoder of the convolutional neural network.

24. The method of any of clauses 14-23, comprising:
receiving a first input from a user; and
capturing the input image in response to the first input from the user.

25. The method of any of clauses 14-24, wherein the method is by a head mounted device comprising at least one processor.

26. The method of any of clauses 14-25, comprising applying at least one image processing operation to the input image based on the blended image segmentation data.

27. A non-transitory, machine-readable storage medium storing instructions that, when executed by at least one processor, cause the at least one processor to perform operations that include:
applying a process to an input image to generate input image feature data characterizing features of the image, and input image segmentation data characterizing an initial segmentation of the input image;
obtaining, for a plurality of reference images, reference image feature data characterizing features of the plurality of reference images, and reference image classification data characterizing classifications of the plurality of reference images;
generating reference image segmentation data based on the reference image feature data, the reference image classification data, and the input image feature data; and
applying a blending process to the input image segmentation data and the reference image segmentation data to generate blended image segmentation data, the blended image segmentation data characterizing a final segmentation of the input image.

28. The non-transitory, machine-readable storage medium of clause 27, wherein the instructions, when executed by the at least one processor, cause the at least one processor to perform additional operations that include:
generating, for each of the plurality of reference images, first reference image data based on the reference image feature data and the reference image classification data corresponding to each of the plurality of reference images; and
generating the reference image segmentation data based on the first reference image data for each of the plurality of reference images and the input image feature data.

29. The non-transitory, machine-readable storage medium of clause 28, wherein the instructions, when executed by the at least one processor, cause the at least one processor to perform additional operations that include:
generating, for each of the plurality of reference images, second reference reference image data based on the first reference image data and the input image feature data; and
generating the reference image segmentation data based on the second reference image data for each of the plurality of reference images.

30. The non-transitory, machine-readable storage medium of any of clauses 27-29, wherein the instructions, when executed by the at least one processor, cause the at least one processor to perform additional operations that include obtaining the plurality of reference images from a data repository.

31. The non-transitory, machine-readable storage medium of any of clauses 27-30, wherein the instructions, when executed by the at least one processor, cause the at least one processor to perform additional operations that include obtaining the reference image feature data from a data repository.

32. The non-transitory, machine-readable storage medium of any of clauses 27-31, wherein the instructions, when executed by the at least one processor, cause the at least one processor to perform additional operations that include applying the process to the plurality of reference images to generate the reference image feature data.

33. The non-transitory, machine-readable storage medium of any of clauses 27-32, wherein the instructions, when executed by the at least one processor, cause the at least one processor to perform additional operations that include displaying the blended image segmentation data.

34. The non-transitory, machine-readable storage medium of any of clauses 27-33, wherein the instructions, when executed by the at least one processor, cause the at least one processor to perform additional operations that include storing the blended image segmentation data within a data repository.

35. The non-transitory, machine-readable storage medium of any of clauses 27-34, wherein the process is a trained machine learning process, and wherein the instructions, when executed by the at least one processor, cause the at least one processor to perform additional operations that include establishing a convolutional neural network to apply the trained machine learning process to the input image.

36. The non-transitory, machine-readable storage medium of clause 35, wherein the input image feature data is an output of an encoder of the convolutional neural network, and the input image segmentation data is an output of a decoder of the convolutional neural network.

37. The non-transitory, machine-readable storage medium of any of clauses 27-36, wherein the instructions, when executed by the at least one processor, cause the at least one processor to perform additional operations that include:
    receiving a first input from a user; and
    capturing the input image in response to the first input from the user.

38. The non-transitory, machine-readable storage medium of any of clauses 27-37, wherein the machine-readable storage medium is part of a head mounted device.

39. The non-transitory, machine-readable storage medium of any of clauses 27-38, wherein the instructions, when executed by the at least one processor, cause the at least one processor to perform additional operations that include applying at least one image processing operation to the input image based on the blended image segmentation data.

40. An image capture device comprising:
    a means for applying a process to an input image to generate input image feature data characterizing features of the image, and input image segmentation data characterizing an initial segmentation of the input image;
    a means for obtaining, for a plurality of reference images, reference image feature data characterizing features of the plurality of reference images, and reference image classification data characterizing classifications of the plurality of reference images;
    a means for generating reference image segmentation data based on the reference image feature data, the reference image classification data, and the input image feature data; and
    a means for applying a blending process to the input image segmentation data and the reference image segmentation data to generate blended image segmentation data, the blended image segmentation data characterizing a final segmentation of the input image.

41. The image capture device of clause 40, comprising:
    a means for generating, for each of the plurality of reference images, first reference image data based on the reference image feature data and the reference image classification data corresponding to each of the plurality of reference images; and
    a means for generating the reference image segmentation data based on the first reference image data for each of the plurality of reference images and the input image feature data.

42. The image capture device of clause 41, comprising:
    a means for generating, for each of the plurality of reference images, second reference image data based on the first reference image data and the input image feature data; and
    a means for generating the reference image segmentation data based on the second reference image data for each of the plurality of reference images.

43. The image capture device of clause 42, comprising a means for obtaining the plurality of reference images from a data repository.

44. The image capture device of any of clauses 40-43, comprising a means for obtaining the reference image feature data from a data repository.

45. The image capture device of any of clauses 40-44, comprising a means for applying the process to the plurality of reference images to generate the reference image feature data.

46. The image capture device of any of clauses 40-45, comprising a means for displaying the blended image segmentation data.

47. The image capture device of any of clauses 40-46, comprising a means for storing the blended image segmentation data within a data repository.

48. The image capture device of any of clauses 40-47, wherein the process is a trained machine learning process, the image capture device comprising a means for establishing a convolutional neural network to apply the trained machine learning process to the input image.

49. The image capture device of clause 48, wherein the input image feature data is an output of an encoder of the convolutional neural network, and the input image segmentation data is an output of a decoder of the convolutional neural network.

50. The image capture device of any of clauses 40-49, comprising:
    comprising a means for receiving a first input from a user; and comprising a means for capturing the input image in response to the first input from the user.

51. The image capture device of any of clauses 40-50, wherein the image capture device is a head mounted device.

52. The image capture device of any of clauses 40-51, comprising a means for applying at least one image processing operation to the input image based on the blended image segmentation data.

Although the methods described above are with reference to the illustrated flowcharts, many other ways of performing the acts associated with the methods may be used. For example, the order of some operations may be changed, and some embodiments may omit one or more of the operations described and/or include additional operations.

Further, although the exemplary embodiments described herein are, at times, described with respect to an image capture device, the machine learning processes, as well as the training of those machine learning processes, may be implemented by one or more suitable devices. For example, in some examples, an image capture device may capture an image (e.g., an image that includes a person's face), and may transmit the image to a distributed or cloud computing system. The distributed or cloud computing system may apply the machine learning processes described herein to generate a segmentation of the image, and may transmit data (e.g., a message) identifying and characterizing the segmented image to the image capture device, or any other suitable device (e.g., a user's cellphone).

Additionally, the methods and system described herein may be at least partially embodied in the form of computer-implemented processes and apparatus for practicing those processes. The disclosed methods may also be at least partially embodied in the form of tangible, non-transitory machine-readable storage media encoded with computer program code. For example, the methods may be embodied in hardware, in executable instructions executed by a processor (e.g., software), or a combination of the two. The media may include, for example, RAMS, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, computer program code segments configure the processor to create specific logic circuits. The methods may alternatively be at least partially embodied in application specific integrated circuits for performing the methods.

We claim:

1. An apparatus comprising:
a non-transitory, machine-readable storage medium storing instructions; and
at least one processor coupled to the non-transitory, machine-readable storage medium, the at least one processor being configured to:
apply a process to an input image to generate input image feature data characterizing features of the input image, and input image segmentation data characterizing an initial segmentation of the input image;
obtain, for a plurality of reference images, reference image feature data characterizing features of the plurality of reference images, and reference image classification data characterizing classifications of the plurality of reference images;
generate reference image segmentation data based on the reference image feature data, the reference image classification data, and the input image feature data; and
combine values of the input image segmentation data with values of the reference image segmentation data to generate blended image segmentation data, the blended image segmentation data characterizing a final segmentation of the input image.

2. The apparatus of claim 1, wherein the at least one processor is further configured to execute the instructions to:
generate, for each of the plurality of reference images, first reference image data based on the reference image feature data and the reference image classification data corresponding to each of the plurality of reference images; and
generate the reference image segmentation data based on the first reference image data for each of the plurality of reference images and the input image feature data.

3. The apparatus of claim 2, wherein the at least one processor is further configured to execute the instructions to:
generate, for each of the plurality of reference images, second reference image data based on the first reference image data and the input image feature data; and
generate the reference image segmentation data based on the second reference image data for each of the plurality of reference images.

4. The apparatus of claim 3, wherein the at least one processor is further configured to execute the instructions to obtain the plurality of reference images from a data repository.

5. The apparatus of claim 1, wherein the at least one processor is further configured to execute the instructions to obtain the reference image feature data from a data repository.

6. The apparatus of claim 1, wherein the at least one processor is further configured to execute the instructions to apply the process to the plurality of reference images to generate the reference image feature data.

7. The apparatus of claim 1, wherein the at least one processor is further configured to execute the instructions to display the blended image segmentation data.

8. The apparatus of claim 1, wherein the at least one processor is further configured to execute the instructions to store the blended image segmentation data within a data repository.

9. The apparatus of claim 1, wherein the process is a trained machine learning process, and wherein the at least one processor is further configured to execute the instructions to establish a convolutional neural network to apply the trained machine learning process to the input image.

10. The apparatus of claim 9, wherein the input image feature data is an output of an encoder of the convolutional neural network, and the input image segmentation data is an output of a decoder of the convolutional neural network.

11. The apparatus of claim 1, wherein the at least one processor is further configured to execute the instructions to:
receive a first input from a user; and
capture the input image in response to the first input from the user.

12. The apparatus of claim 1, wherein the apparatus is a head mounted device.

13. The apparatus of claim 1, wherein the at least one processor is further configured to execute the instructions to apply at least one image processing operation to the input image based on the blended image segmentation data.

14. A method for image segmentation comprising:
applying a process to an input image to generate input image feature data characterizing features of the input image, and input image segmentation data characterizing an initial segmentation of the input image;
obtaining, for a plurality of reference images, reference image feature data characterizing features of the plurality of reference images, and reference image classification data characterizing classifications of the plurality of reference images;
generating reference image segmentation data based on the reference image feature data, the reference image classification data, and the input image feature data; and
combining values of the input image segmentation data with values of the reference image segmentation data to generate blended image segmentation data, the blended image segmentation data characterizing a final segmentation of the input image.

15. The method of claim 14, comprising:
generating, for each of the plurality of reference images, first reference image data based on the reference image feature data and the reference image classification data corresponding to each of the plurality of reference images; and
generating the reference image segmentation data based on the first reference image data for each of the plurality of reference images and the input image feature data.

16. The method of claim 15, comprising:
generating, for each of the plurality of reference images, second reference image data based on the first reference image data and the input image feature data; and
generating the reference image segmentation data based on the second reference image data for each of the plurality of reference images.

17. The method of claim 14, comprising applying the process to the plurality of reference images to generate the reference image feature data.

18. The method of claim 14, wherein the process is a trained machine learning process, the method comprising establishing a convolutional neural network to apply the trained machine learning process to the input image.

19. A non-transitory, machine-readable storage medium storing instructions that, when executed by at least one processor, cause the at least one processor to perform operations that include:
applying a process to an input image to generate input image feature data characterizing features of the input image, and input image segmentation data characterizing an initial segmentation of the input image;
obtaining, for a plurality of reference images, reference image feature data characterizing features of the plurality of reference images, and reference image classification data characterizing classifications of the plurality of reference images;
generating reference image segmentation data based on the reference image feature data, the reference image classification data, and the input image feature data; and
combining values of the input image segmentation data with values of the reference image segmentation data to generate blended image segmentation data, the blended image segmentation data characterizing a final segmentation of the input image.

20. The non-transitory, machine-readable storage medium of claim 19, wherein the instructions, when executed by the at least one processor, cause the at least one processor to perform additional operations that include:
generating, for each of the plurality of reference images, first reference image data based on the reference image feature data and the reference image classification data corresponding to each of the plurality of reference images; and
generating the reference image segmentation data based on the first reference image data for each of the plurality of reference images and the input image feature data.

* * * * *